UNITED STATES PATENT OFFICE.

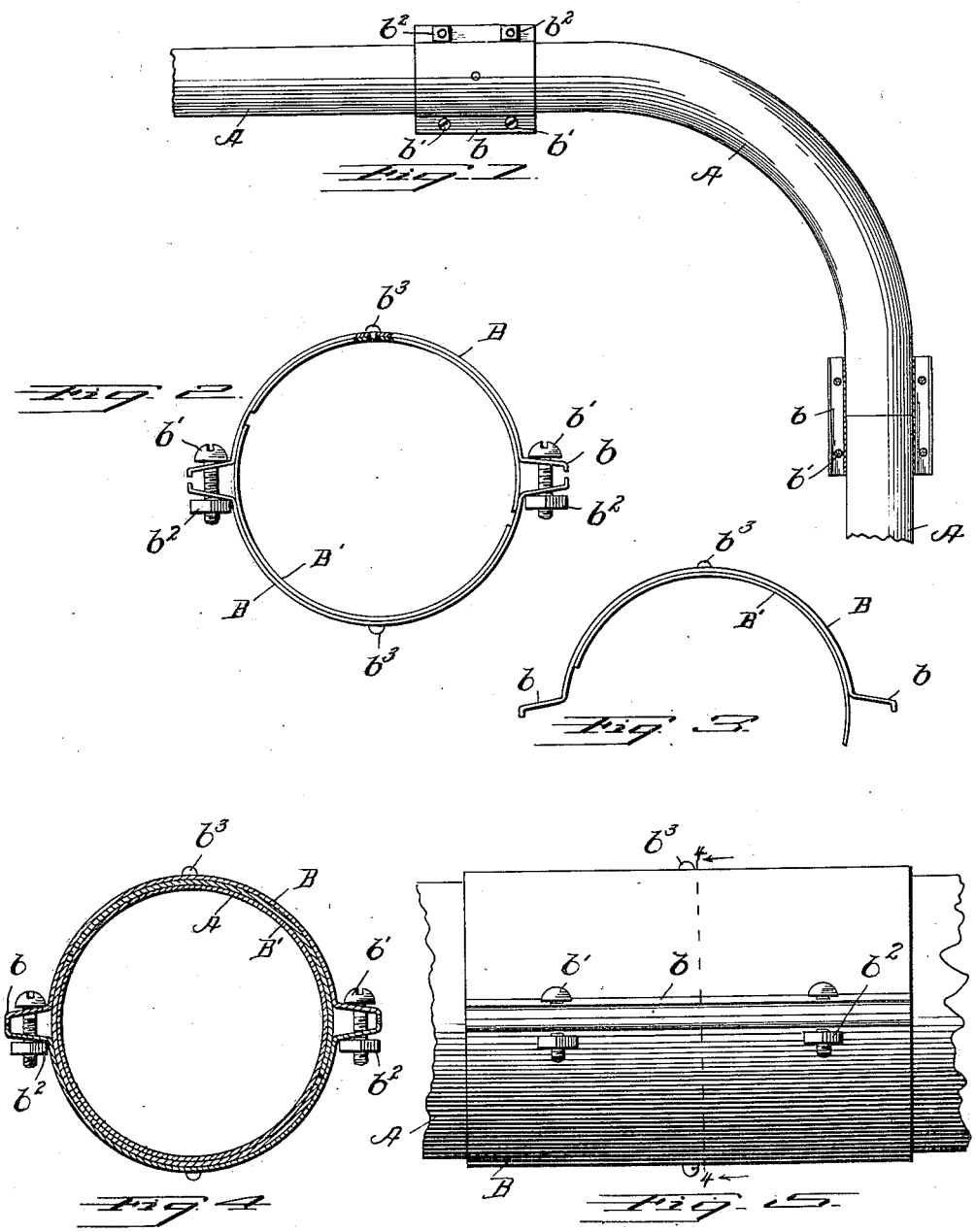

THOMAS BEMIS, OF INDIANAPOLIS, INDIANA.

PNEUMATIC TUBE FOR STORE SERVICE.

No. 812,162.   Specification of Letters Patent.   Patented Feb. 6, 1906.

Application filed December 18, 1905. Serial No. 292,330.

*To all whom it may concern:*

Be it known that I, THOMAS BEMIS, a citizen of the United States, residing at Indianapolis, in the county of Marion and State of Indiana, have invented certain new and useful Improvements in Pneumatic Tubes for Store Service, of which the following is a specification.

In the use of pneumatic tubes for store service it is of advantage to have the sections composing such tubes coupled together by coupling devices which not only make airtight joints, but which are easily and quickly removable in order that the tube may be opened at any joint throughout the line to enable carriers to be removed should they become stopped therein from any cause, particularly at the curves, where because of some impediment or some irregularity in the carrier it may at times get hung up.

My said invention consists, therefore, in an improved construction of devices for coupling the sections of pneumatic tubes to secure the advantages above noted, as will be hereinafter more fully described and claimed.

Referring to the accompanying drawings, which are made a part hereof and on which similar reference characters indicate similar parts, Figure 1 is a side elevation of a pneumatic tube at the point of a curve therein, showing the curved section coupled to the straight sections with my improved coupling devices, one of which is shown in section; Fig. 2, an end elevation of one of my coupling-sleeves with the parts assembled and in their normal positions before being clamped to the tube; Fig. 3, a similar view of one of the parts of said coupling-sleeve; Fig. 4, a cross-section looking in the direction indicated by the arrows from the dotted line 4 4 in Fig. 5 with the parts in the position they occupy when clamped upon the tube; and Fig. 5, a side elevation of a joint in a tube made by one of the couplings, the parts being in operative position.

In said drawings the portions marked A represent the line of tubing, and B B the coupling-sleeve. The tubing A is of any character desired suitable for pneumatic service and is composed of curved and straight sections, as is usual. The coupling-sleeve is preferably composed of two duplicate parts B B, each of which is of substantially semicylindrical form and has its edges bent outwardly in substantially the shape shown in Figs. 2 and 3 when in their normal position, forming flanges $b$, which extend the length of the sleeve and project at an angle, so that they will taper from the main body of the sleeve part to their outer edges in a direction toward each other. The extreme outer edges of said flanges $b$ are bent over at right angles, so that when the two parts are brought together they will form a rib along the sides of the sleeve with closed surfaces. Clamping-screws $b'$ and nuts $b^2$ are provided for clamping and securing the parts, the nuts being held by their straight edges resting against the sleeve part. The sides of the flanges $b$ being at an angle to each other, a certain amount of elasticity or spring is afforded thereto, so that by screwing the clamping-screws $b'$ more or less tightly in the nuts $b^2$ said flanges may be drawn together at the base to clamp the pipe-section, such a movement until the sides of said flanges are parallel being permitted. Each sleeve-section B has a separate semicylindrical section $B'$, secured by a rivet $b^3$ or otherwise on its inside, one edge of each part $B'$ being arranged to extend beyond the edge on the part B a distance to overlap the joint between the two parts. By this means as the screws $b'$ are tightened said parts $B'$ are drawn together from the position shown in Fig. 2 to the position shown in Fig. 4, so that a complete and air-tight joint is formed over the joint between the ends of the pipe-sections A. The tapered formation of the flanges $b$ of the sleeve B permit this operation, as above described, the inturned points of the outer edge of said flanges $b$ serving as a fulcrum over which the lower parts of said flanges are forced toward each other until a tight joint is formed and further serving to maintain a smooth and closed joint between the two parts.

Having thus fully described my said invention, what I claim as new, and desire to secure by Letters Patent, is—

1. A pneumatic tube for store service comprising a plurality of sections coupled together by a divided sleeve, a separate divided cylindrical section secured within said sleeve with its joint to one side of the joint in said sleeve, each edge of said sleeve having an outwardly-extending flange, which flanges extend toward each other at an angle and have their outer edges turned toward each other and adapted to meet to form a rib with a closed outer edge, and clamping-bolts extending through said flanges to draw them toward each other and clamp said sleeve upon said tube-sections, substantially as set forth.

2. In a pneumatic tube for store service, &c., the combination with two sections thereof, of a clamping-sleeve for securing them together comprising two parts, each part being substantially semicylindrical in form with outwardly-extending flanges on its edges, clamping-bolts extending through said flanges, and a second semicylindrical part secured within each part of said clamping-sleeve with one edge extending beyond the edge of said clamping-sleeve part and its other edge not extending to the edge of said sleeve part, whereby said internal sections when brought together form a complete cylinder with a smooth interior surface with joints to one side of the joints between said sleeve parts, substantially as set forth.

In witness whereof I have hereunto set my hand and seal, at Washington, District of Columbia, this 16th day of December, A. D. 1905.

THOMAS BEMIS. [L. S.]

Witnesses:
A. M. PARKINS,
E. W. BRADFORD.